US006236973B1

(12) United States Patent
Dillard

(10) Patent No.: US 6,236,973 B1
(45) Date of Patent: May 22, 2001

(54) APPARATUS AND METHOD FOR PROVIDING COLLATERAL CONSTRUCTION LOAN INSURANCE COVERAGE

(76) Inventor: Greg Dillard, 88 W. Athens St., Winder, GA (US) 30680

( * ) Notice: Subject to any disclaimer, the term of this patent is extended or adjusted under 35 U.S.C. 154(b) by 0 days.

(21) Appl. No.: 09/518,125

(22) Filed: Mar. 3, 2000

Related U.S. Application Data

(60) Provisional application No. 60/137,118, filed on Jun. 2, 1999.

(51) Int. Cl.[7] .................... G06F 19/40

(52) U.S. Cl. .................... 705/4; 705/35; 705/36; 705/37; 705/38; 705/39

(58) Field of Search .................... 705/4, 35, 36, 705/37, 38, 39

(56) References Cited

U.S. PATENT DOCUMENTS

| | | | | |
|---|---|---|---|---|
| 5,202,827 | | 4/1993 | Sober | 364/408 |
| 5,323,315 | * | 6/1994 | Highbloom | 364/408 |
| 5,636,117 | | 6/1997 | Rothstein | 395/204 |
| 5,644,726 | | 7/1997 | Oppenheimer | 395/238 |
| 5,806,042 | | 9/1998 | Kelly | 705/4 |
| 5,819,230 | | 10/1998 | Christie | 705/4 |
| 5,855,005 | | 12/1998 | Schuler | 705/4 |
| 5,855,055 | | 1/1999 | Boudreau | 29/596 |
| 5,870,721 | | 2/1999 | Norris | 705/38 |
| 5,878,404 | | 3/1999 | Stout, Jr. | 705/38 |
| 5,893,072 | * | 4/1999 | Zizzamia | 705/4 |
| 5,903,873 | | 5/1999 | Peterson | 705/4 |
| 5,907,828 | | 5/1999 | Meyer | 705/4 |
| 5,907,848 | * | 5/1999 | Zaiken et al. | 707/202 |

FOREIGN PATENT DOCUMENTS

98/53417 * 11/1998 (WO) .................... G06F/19/40

OTHER PUBLICATIONS

Peter Larr, Two sides of collateral: Security and danger, Journal of Lending & Credit Risk Management, v78, n9, p61–70, May 1996.*

Corporate ResourceNet. Who likes CLOS, CBOS and CAT bonds, Assest Sales Report, V12, n8, p3, Feb. 23, 1998.*

PR Newswire, First american Introduces Product for Commerical Loans and Financial Markets: New UCC Policy offers lien perfection and priority insurance, pNA, May 5, 2000.*

Walker F. Todd, Lessons from the Collapse of three State–Chartered private deposit insurance funds, Economic Commentary, Federal Reserve Bank of Cleveland, May 1994.*

* cited by examiner

*Primary Examiner*—Vincent Millin
*Assistant Examiner*—Pedro Kanof
(74) *Attorney, Agent, or Firm*—Baker, Donelson, Bearman & Caldwell

(57) ABSTRACT

A centralized automated apparatus for lending institutions to initiate, report and confirm insurance coverage on buildings used as collateral for construction loans under a single builder's risk policy provided by an insurance provider with the lending institution named as the named insured and the borrower/builder named as additional insured. Coverage rates are computed for construction loans added to the system by the lending institution using rate information provided by the insurance provider. Premium payments are transferred from the lending institution to the insurance provider for active loans from escrowed construction loan proceeds. The apparatus provides management reports for the lending institution and the insurance provider of new loans, active loans, funds transfers for reconcilation, premium payments and repayments for closed loans, and loss evaluations. A method of centrally providing collateral coverage for construction loans from a lending institution to builders under a single policy from an insurance provider is disclosed.

13 Claims, 7 Drawing Sheets

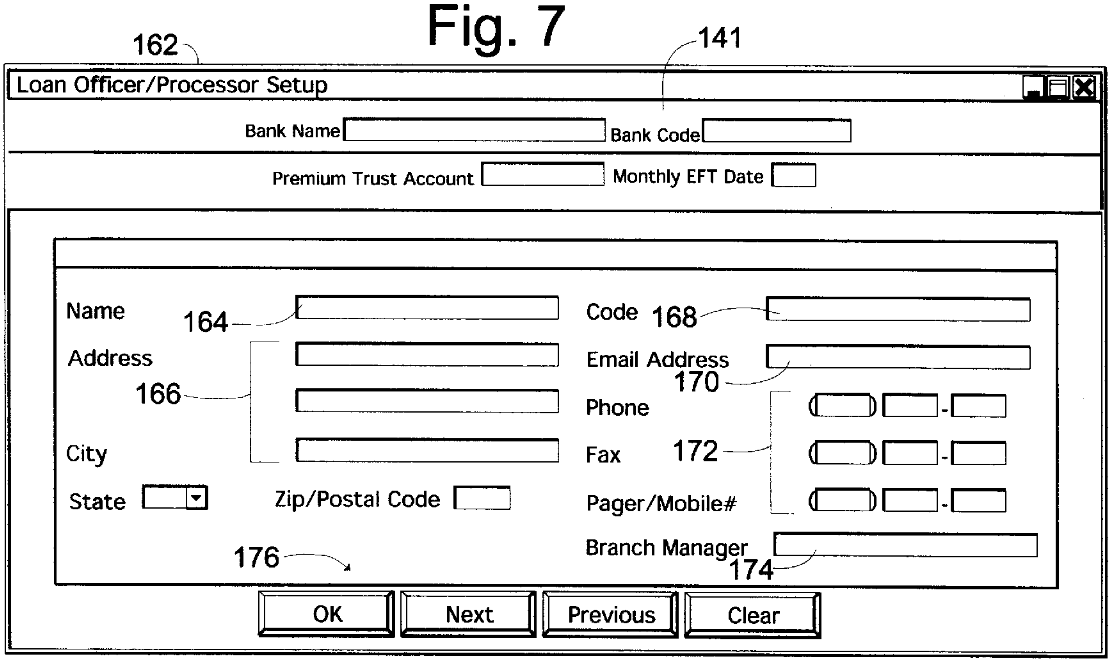

Fig. 7

Loan Officer/Processor Setup — 162, 141

- Bank Name
- Bank Code
- Premium Trust Account
- Monthly EFT Date

Name — 164
Address — 166
City
State    Zip/Postal Code
176

Code — 168
Email Address — 170
Phone
Fax — 172
Pager/Mobile#
Branch Manager — 174

[ OK ] [ Next ] [ Previous ] [ Clear ]

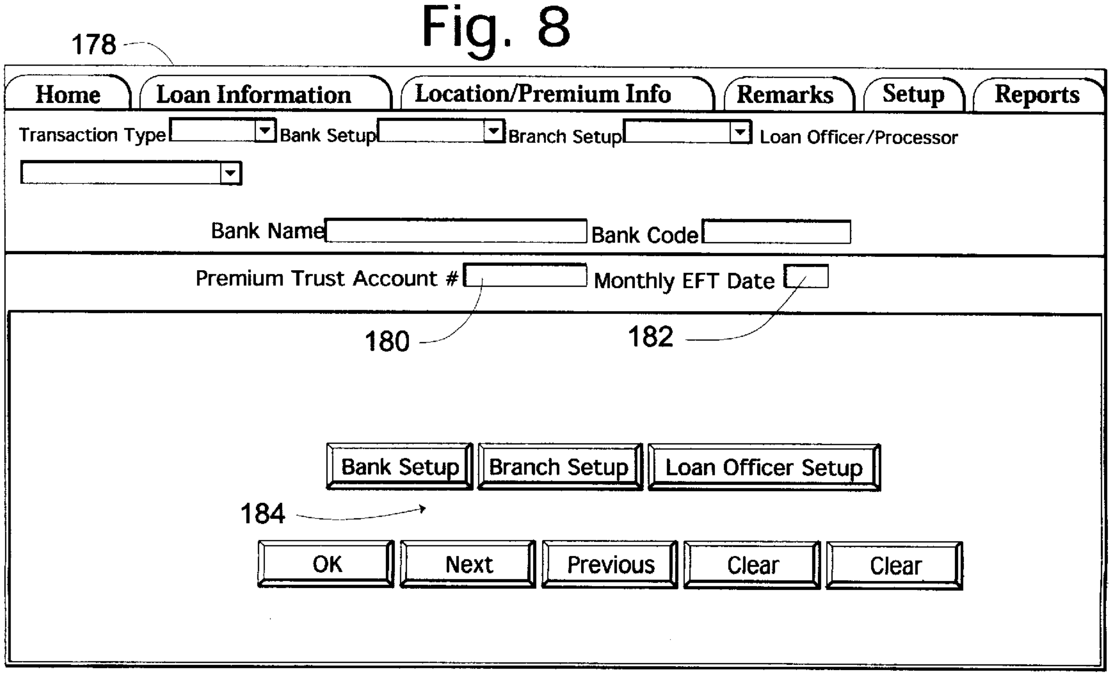

| Home | Loan Information | Location/Premium Info | Remarks | Setup | Reports |

Transaction Type [▼] Bank Setup [▼] Branch Setup [▼] Loan Officer/Processor
[▼]

Bank Name         Bank Code
Premium Trust Account #  — 180     Monthly EFT Date — 182

[ Bank Setup ] [ Branch Setup ] [ Loan Officer Setup ]

184

[ OK ] [ Next ] [ Previous ] [ Clear ] [ Clear ]

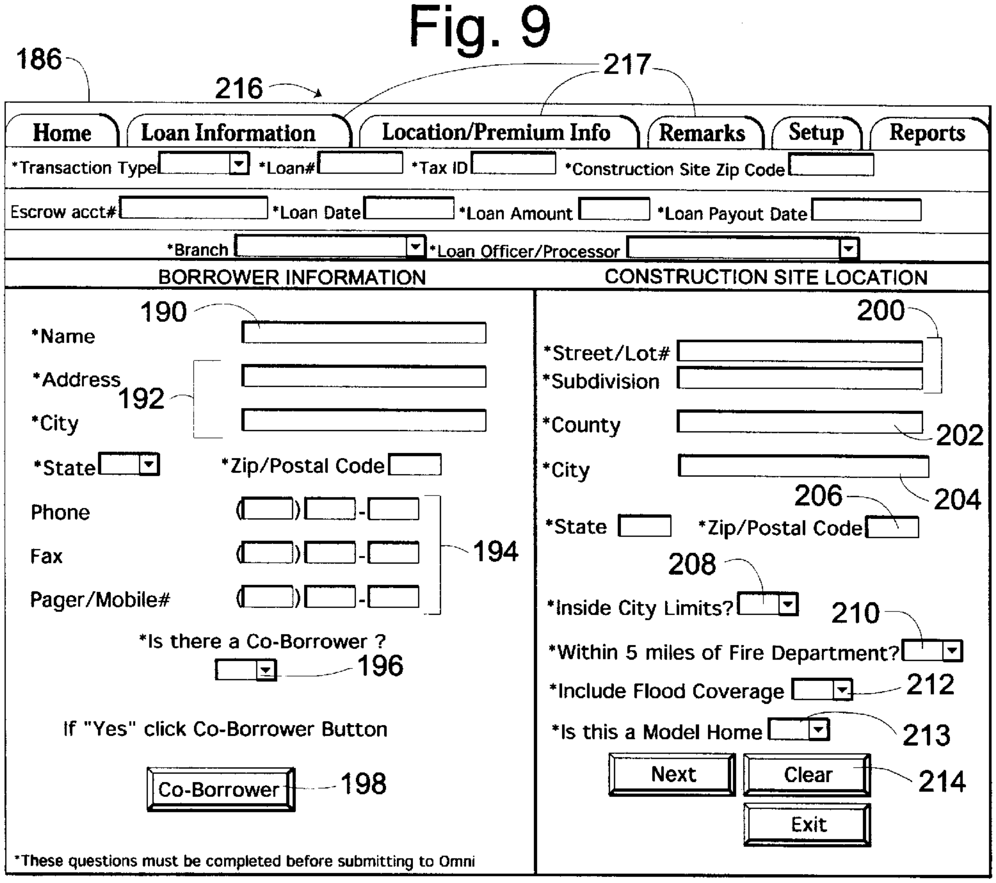

Fig. 9

| Home | Loan Information | Location/Premium Info | Remarks | Setup | Reports |

*Transaction Type [ ▼ ]  *Loan# [    ]  *Tax ID [    ]  *Construction Site Zip Code [    ]

Escrow acct# [    ]  *Loan Date [    ]  *Loan Amount [    ]  *Loan Payout Date [    ]

*Branch [    ▼ ]  *Loan Officer/Processor [    ▼ ]

BORROWER INFORMATION | CONSTRUCTION SITE LOCATION

Borrower Information:
- *Name [    ]
- *Address [    ]
- *City [    ]
- *State [ ▼ ]  *Zip/Postal Code [    ]
- Phone ( ) [ ]-[ ]
- Fax ( ) [ ]-[ ]
- Pager/Mobile# ( ) [ ]-[ ]
- *Is there a Co-Borrower ? [ ▼ ]
- If "Yes" click Co-Borrower Button
- [ Co-Borrower ]

Construction Site Location:
- *Street/Lot# [    ]
- *Subdivision [    ]
- *County [    ]
- *City [    ]
- *State [ ]  *Zip/Postal Code [    ]
- *Inside City Limits? [ ▼ ]
- *Within 5 miles of Fire Department? [ ▼ ]
- *Include Flood Coverage [ ▼ ]
- *Is this a Model Home [ ▼ ]
- [ Next ]  [ Clear ]
- [ Exit ]

*These questions must be completed before submitting to Omni

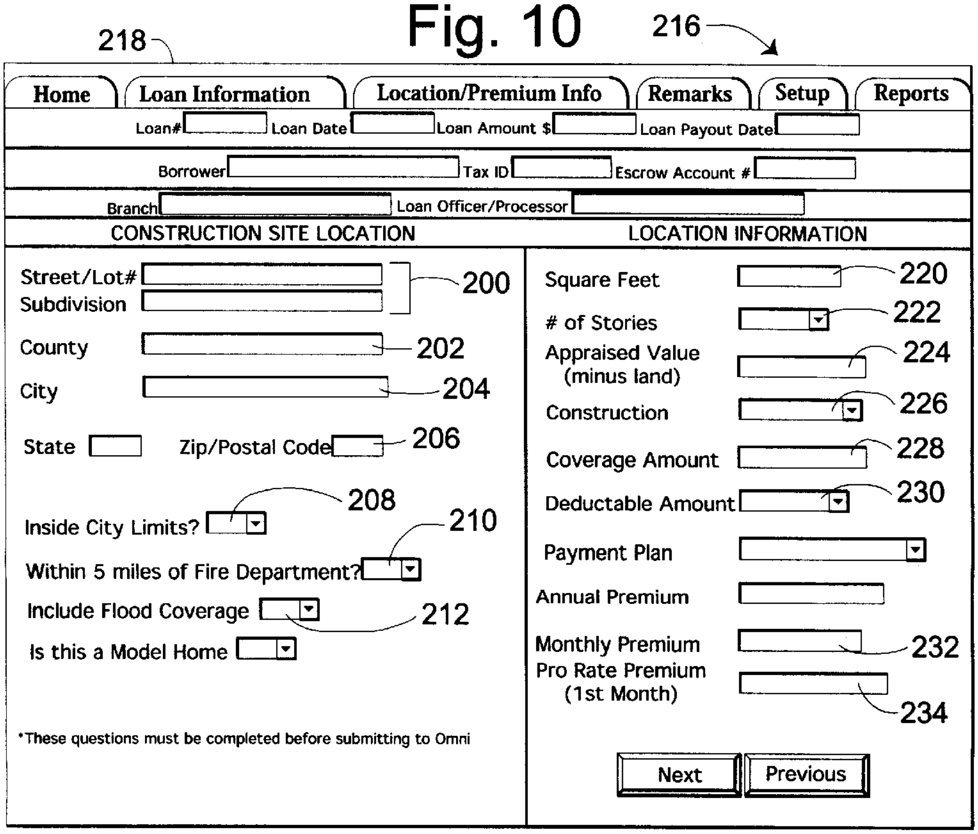

Fig. 10

| Home | Loan Information | Location/Premium Info | Remarks | Setup | Reports |

Loan# [    ]  Loan Date [    ]  Loan Amount $ [    ]  Loan Payout Date [    ]

Borrower [    ]  Tax ID [    ]  Escrow Account # [    ]

Branch [    ]  Loan Officer/Processor [    ]

CONSTRUCTION SITE LOCATION | LOCATION INFORMATION

Construction Site Location:
- Street/Lot# [    ]
- Subdivision [    ]
- County [    ]
- City [    ]
- State [ ]  Zip/Postal Code [    ]
- Inside City Limits? [ ▼ ]
- Within 5 miles of Fire Department? [ ▼ ]
- Include Flood Coverage [ ▼ ]
- Is this a Model Home [ ▼ ]

Location Information:
- Square Feet [    ]
- # of Stories [ ▼ ]
- Appraised Value (minus land) [    ]
- Construction [ ▼ ]
- Coverage Amount [    ]
- Deductable Amount [ ▼ ]
- Payment Plan [ ▼ ]
- Annual Premium [    ]
- Monthly Premium [    ]
- Pro Rate Premium (1st Month) [    ]

[ Next ]  [ Previous ]

*These questions must be completed before submitting to Omni

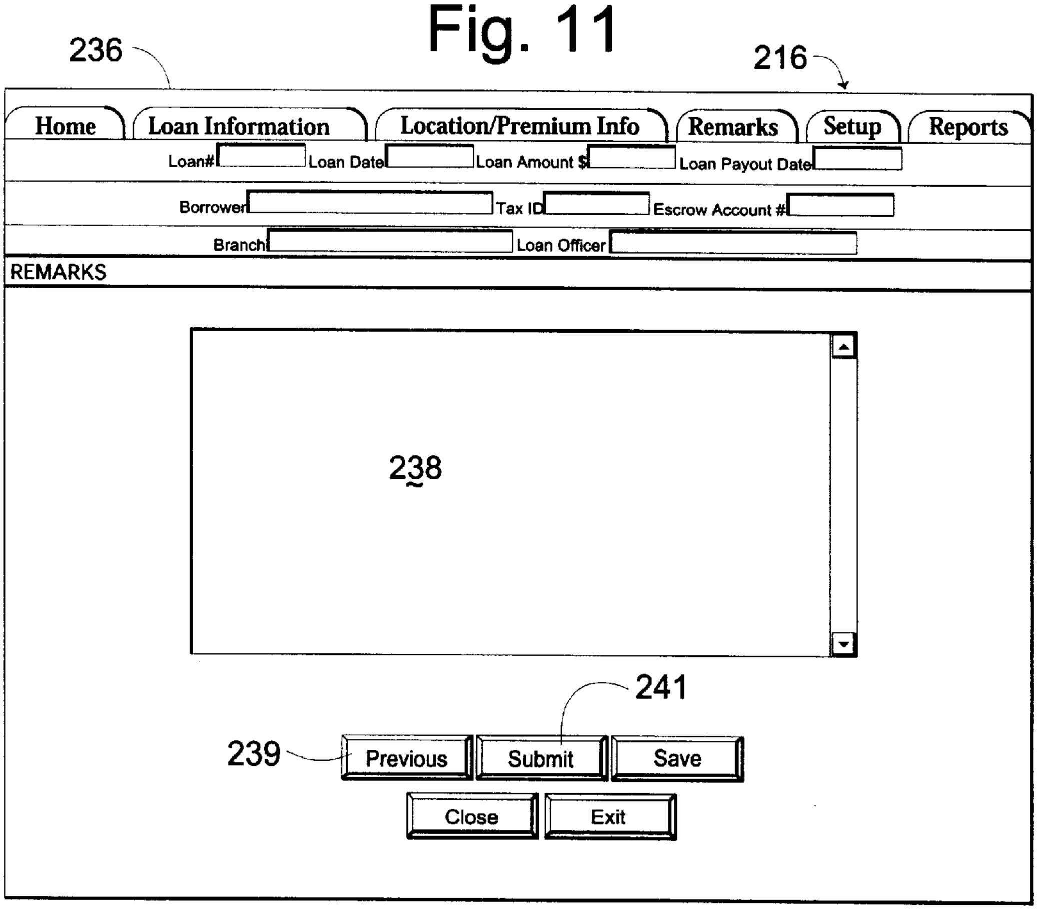

Fig. 11

| Home | Loan Information | Location/Premium Info | Remarks | Setup | Reports |

Loan# ___ Loan Date ___ Loan Amount $ ___ Loan Payout Date ___
Borrower ___ Tax ID ___ Escrow Account # ___
Branch ___ Loan Officer ___

REMARKS

238

239 — [Previous] [Submit] [Save]   241
[Close] [Exit]

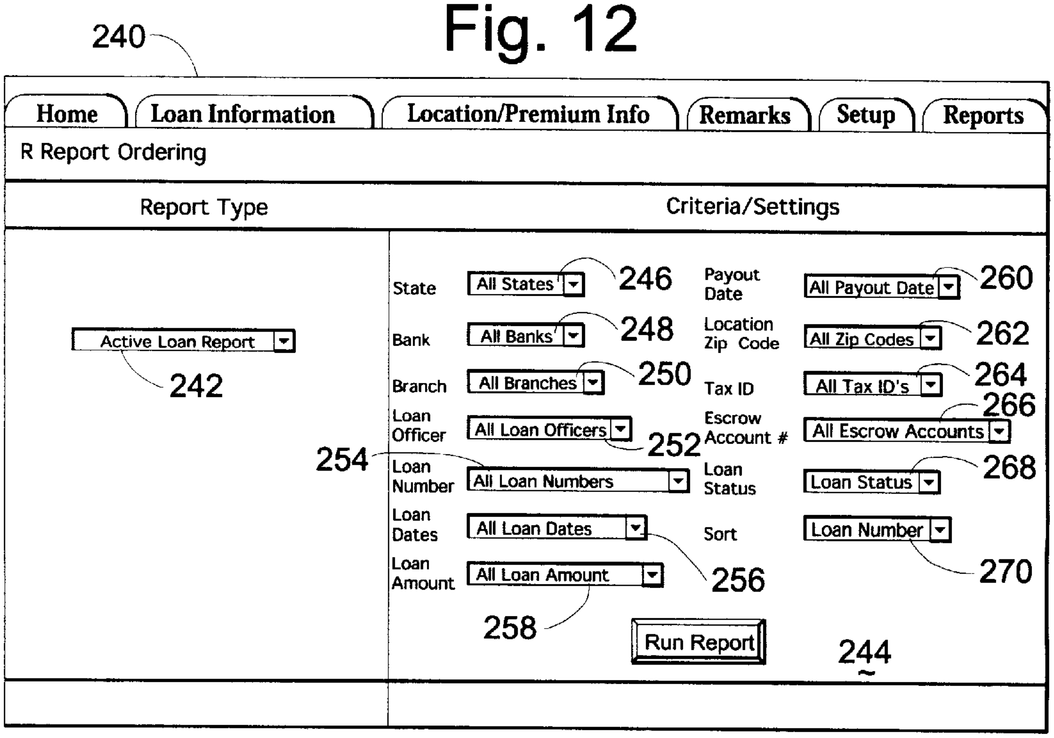

| Home | Loan Information | Location/Premium Info | Remarks | Setup | Reports |

R Report Ordering

| Report Type | Criteria/Settings |

State [All States ▼] 246   Payout Date [All Payout Date ▼] 260
Bank [All Banks ▼] 248   Location Zip Code [All Zip Codes ▼] 262
Branch [All Branches ▼] 250   Tax ID [All Tax ID's ▼] 264
Active Loan Report ▼   Loan Officer [All Loan Officers ▼] 252   Escrow Account # [All Escrow Accounts ▼] 266
242   254   Loan Number [All Loan Numbers ▼]   Loan Status [Loan Status ▼] 268
Loan Dates [All Loan Dates ▼]   Sort [Loan Number ▼] 270
Loan Amount [All Loan Amount ▼] 256
258   [Run Report]   244

APPARATUS AND METHOD FOR PROVIDING COLLATERAL CONSTRUCTION LOAN INSURANCE COVERAGE

The present application claims the benefit of the earlier filed provisional patent application Ser. No. 60/137,118, filed Jun. 2, 1999.

TECHNICAL FIELD

The present invention relates to insuring construction loans made by lending institutions. More particularly, the present invention relates to apparatus and methods for initiating, reporting, and verifying insurance coverage on portfolios of construction loan collateral for lending institutions and insurance carriers.

BACKGROUND OF THE INVENTION

Lending institutions provide construction loans by which contractors fund the purchase of building materials and labor for erecting buildings. Buildings being constructed pass through various phases, from clearing land, foundation, framing, interior construction, installation of fixtures, painting and flooring, and completion activities. Each phase reflects an increasing amount of capital investment necessary to fund the building materials and labor for construction using the building materials. The funds required for the building materials and labor are drawn by the contractor from the loan approved in advance by the lending institution for the particular construction project. Often, contractors have a number of on-going construction projects; for example, a number of individual residential houses being constructed at one or more subdivisions. Each project is subject to a separate construction loan.

The lending institution is concerned with repayment of the construction loan. Typically, construction loans are repaid at a closing when the purchaser accepts the constructed property and makes payment for the purchase and sale of the constructed property. For most purchasers, the construction loan made by the lending institution is paid from proceeds derived by the purchaser from a purchase money loan from a lending institution. The purchase money loan is then subject to the repayment terms of the loan. During construction, however, the contractor opening the construction loan is responsible for repayment of funds advanced from the lending institution to the contractor. As discussed above, the construction activities by the contractor reflect increased financial exposure by the lending institution to a partially-constructed building. To assure repayment of the advanced funds in the event of failure to complete the construction project, lending institutions require the contractor have adequate insurance for destruction or loss incurred to the partially constructed building during the course of constructing the project for which the lending institution is advancing funds. The lending institution also periodically inspects the property to assure that the funds being advanced to the contractor are being used to provide the building materials and labor for the construction of the building.

Generally, construction projects are protected under an insurance policy known as a builders' risk insurance policy. This insurance policy is written by an insurance carrier for each of the particular individual projects. The insurance policy is made in the name of either the contractor, the owner, or both of these parties, and provides that the lending institution funding the construction is listed as the as the mortgagee or loss payee. In the event of a documented loss such as destruction of the partially constructed building during the course of construction, the proceeds of the insurance policy are paid to the lending institution. Each project accordingly is subject to not only a separate construction loan from a lending institution, but also to a separate insurance policy from an insurance carrier.

While the described construction loan insurance program has been long used for construction project, there are drawbacks to this. This method of protection involves many individual short term policies. Also, there is a lack of uniform insurance coverage related to the value of the construction and the value of the advanced funds. This method of protection has a high level of dependency on the contractor and/or owner/borrower to initiate and maintain coverage when the lending institution is the party with the most capital at risk. Such insurance mechanism, while widely practiced, is not only inefficient, but exposes the banking system to undue risk.

Accordingly, there is a need in the art for an improved construction loan insurance apparatus and method directed to minimizing the deficiencies in the present collateral loan insurance programs. It is to such that the present invention is directed.

SUMMARY OF THE PRESENT INVENTION

The present meets the need in the art by providing an apparatus for initiating, maintaining, and reporting collateral loan insurance for construction loans made by a lending institution to at least one construction contractor, comprising a central electronic complex that maintains a database of collateral insurance provided by an insurance carrier under a single builder's risk policy for a plurality of construction loans originated by a lending institution for projects constructed by one or more builders. The insurance carrier communicates with the electronic complex to provide insurance rate information and to obtain reports about collateral insurance for the construction loans. The lending institution communicates with the electronic complex to initiate, maintain, and report on collateral insurance for construction loans provided by the lending institution to the builders under the single builder's risk policy. The apparatus provides a report generator for reporting to the insurance carrier and to the lending institution information about the collateral insurance and the building projects covered by the single policy.

In another aspect, the present invention provides a method of centralized initiation, maintenance, and reporting of collateral insurance for a construction loan portfolio held by a lending institution, comprising the steps of (a) calculating an insurance rate for a construction loan provided by a lending institution to a builder using rate information provided by a insurance carrier; (b) initiating insurance coverage under a single builder's risk policy provided by the insurance carrier to the lending institution by adding to a central coverage database identifying indicia related to the construction loan and builder; (c) providing premium payments for the insurance coverage from the lending institution to the insurance carrier on behalf of the builder holding the construction loan with the lending institution; and (d) confirming insurance coverage by the insurance carrier to the lending institution for the construction loan to the builder under the single policy provided by the insurance carrier to the lending institution.

Objects, advantages and features of the present invention will become apparent from a reading of the following detailed description of the invention and claims in view of the appended drawings.

BRIEF DESCRIPTION OF THE DRAWINGS

FIGS. 5–12 are screen displays for the construction loan collateral insurance apparatus according to the present invention.

DETAILED DESCRIPTION OF THE PREFERRED EMBODIMENTS

Figure 1:
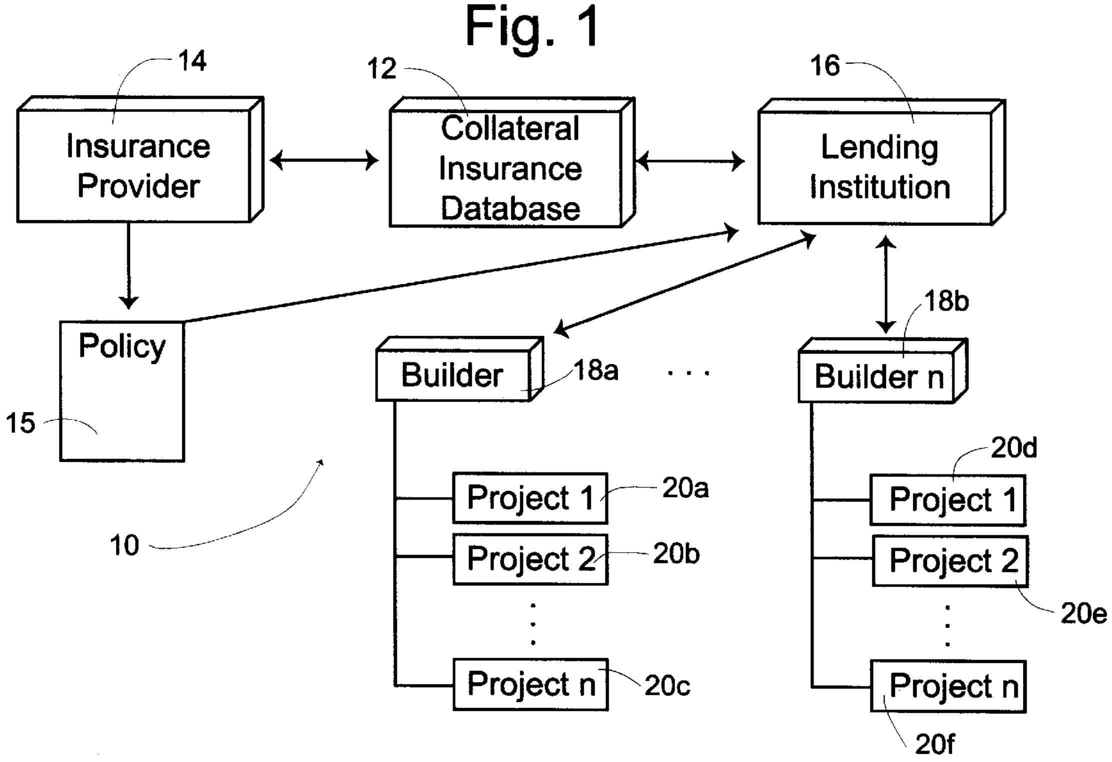
FIG. 1 is a schematic illustration of the construction loan collateral insurance apparatus according to the present invention.

Referring now in more detail to the drawings in which like parts have like identifiers, FIG. 1 is a schematic illustration of the construction loan collateral insurance apparatus 10 according to the present invention. The apparatus 10 provides a central electronic computer complex 12 that maintains on a permanent storage device a database of information related to the collateral insurance provided by an insurance carrier 14 under a single builder's risk policy 15 to one of a plurality of lending institutions 16 for construction loans made by the lending institution. The lending institution 16 provides the construction loans upon approval to a plurality of builders 18. Each builder 18 holds a construction loan for each of the projects 20 under construction by the builder. Generally, the single builder's risk policy 15 is a conventional builder's risk monthly reporting form builder's risk policy written by the insurance provider 14 with the lending institution 16 as the primary named insured, or loss payee, and the builder 18 as an additional named insured. The insurance provider 14 and the lending institution 16 are each provided with at least one microprocessor-based computer with interactive communications software for accessing the central electronic database 12.

Figure 2:
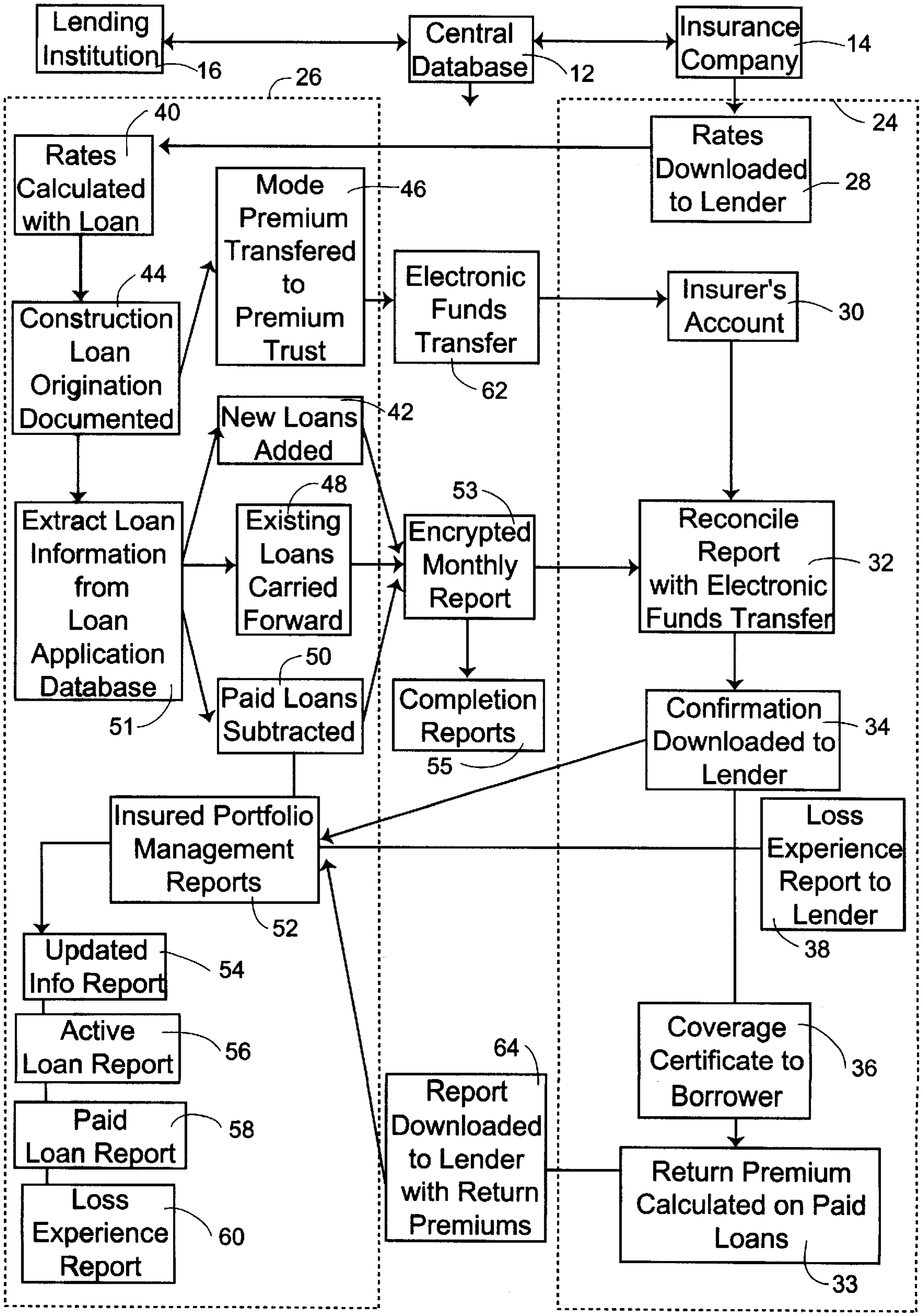
FIG. 2 is a detailed schematic flowchart of method of providing collateral insurance for construction loan portfolios according to the present invention.

FIG. 2 illustrates a schematic view of an embodiment of the construction loan collateral insurance apparatus 10. Briefly, the apparatus 10 includes the central database 12 which operatively communicates with the insurance carrier 14 and the lending institution 16. The insurance carrier 14 interacts 24 with the apparatus 10 to provide insurance rate and loss experience information and to report the transfer of premiums and return premiums for paid loans, as discussed below. The lending institution 16 interacts 26 with the apparatus 10 for managing insurance coverage for collateral loans subject of the blanket policy 15 including establishing new loans, processing premiums for existing loans, and closing loans, and to coordinate transfer of premiums and return premiums for paid loans, as discussed below.

The interface 24 for the insurance carrier 14 includes providing the database 12 with rate information 28 for the amounts of insurance coverage at one or more deductible levels. The deductible is selected by the lending institution 16 as a loan requirement or by the builder 18, depending upon the loss risk the lending institution and the builder want to carry. The insurance carrier 14 also has a bank account for receiving premiums 30 and return of premiums on closed loans 33. Reports are generated by the apparatus 10 for reconciling funds transfer 32, for confirmation of coverage 34 and coverage certificates 36. Loss experiences of builders 18 are reported 38 for evaluation by the lending institution 16. On the lending institution side 26, the apparatus 10 computes 40 insurance rates using the rate information provided by the insurance carrier 14. The apparatus 10 receives new loans 42 to builders 18 for coverage including origination documentation 44 and premium mode transfer 46. Existing loans subject to the policy for builders 18 are evaluated 48 and closed loans are processed 50, with communication 51 of loan information from the database. Reports are generated 52, 53 by the apparatus 10 for management review, including upload information 54, active loans 56, paid (closed) loans 58, and loss experience 60. The apparatus 10 preferably includes electronic funds transfer for premium payment 62 and return of premium for closed loans 64.

With continuing reference to FIG. 2, insurance premium rate for each construction loan is calculated 40 when the loan information and data 44 is entered by the lending institution 16 to the database 12 using the origination documentation conventional with the lending institution 16. The loan information generally includes informational indicia about the builder 18 and its loss experience, the description of the property subject of the loan, the maximum construction loan amount, the interest rate and loan payment terms, and other conventional information related to the secured property. The insurance coverage under the single policy 15 is initiated 42 when the particular construction loan is made by the lending institution 16 to the builder 18. The apparatus 10 transfers 46 the premium for the insurance coverage from the construction loan account at the lending institution 16 to the premium trust account on behalf of the insurance carrier 14. The premium is either an annual premium or the first month's premium (depending upon the selected premium payment frequency). The premium is drawn from the escrowed construction loan proceeds at the lending institution 16 to the lending institution's premium trust account. Once each month, the apparatus compiles 53 a premium report by extracting information from the stored loan data. This report includes complete informational indicia on each loan in the insured portfolio such as the lending institution's code number, the branch code, the loan number, the origination date, the borrower name, address, phone number and federal tax ID number, the physical address of the property, amount of coverage, deductible amount and premium amount. The apparatus 10 then withdraws the premium from the lending institution's premium trust account and forwards the funds to the account 30 of the insurance carrier 14 with a coverage. The insurance carrier reconciles 32 the transfer and provides confirmation 34 to the lending institution of coverage. Certificates of coverage are issued 36 to the builder 18. Return premium payments are computed for paid (closed) loans 33. The return premiums are preferably transferred by electronic funds transfer from the account 30 of the insurance carrier 14 to the lending institution earmarked for the appropriate loan, together with a report of return premiums 64.

More particularly described, the present invention provides a centralized apparatus 10 and method for lending institutions 16 to initiate insurance coverage for collateral insurance of construction loans from insurance providers 14 under a blanket policy 15, to pay the insurance premium from escrowed funds, and to receive electronic or written confirmations directly from the insurance carrier 14 that the collateral property 20 for the construction loan is properly insured with insured portfolio reports including upload information reports, active loan reports, paid loan reports, reports by branch and status reports on each loan insured. The apparatus 10 coordinates the receipt and recording of loss data on insured property 20 which facilitates the lending institution 16 evaluating loss experience by loan, branch, builder, or the entire portfolio. The apparatus 10 aids underwriting by flagging critical information for problem resolution. The insurance provider 14 receives coverage reports and reconcilations with funds transfers, together with confirmations and coverage certificates for insured loans. Critical occupancy data is tracked for underwriting evaluation.

From the insurance company side, the apparatus 10 receives a coverage report from the lending institution 16, preferably by uploading by an network communication system. The insurance carrier 14 reconciles the coverage of properties 20 with the transfer of premiums, which is preferably by electronic funds transfer. The apparatus 10 generates a confirmation report that is downloaded to the lending institution 16 and recorded for each loan insured. The apparatus 10 generates coverage certificates for each builder/borrower 18 that details the property 20 locations insured for that borrower. For underwriting purposes, the apparatus records and tracks the number of months that each property 20 has been insured, particularly so that a property that is complete and vacant can be identified after a predetermined period, typically 12 months, of continuous coverage and appropriate underwriting action taken, as discussed below. The apparatus 10 calculates the return premium on all loans paid during the prior monthly reporting period. These unearned premiums are prorated to the day the loan was paid and a report will be downloaded to the lending institution 16 along with a return of the unearned premiums, preferably by electronic funds transfer.

The information stored in the database 12 is further useful by the insurance carrier 14 in soliciting the permanent property insurance coverage on the completed construction project. The apparatus 10 identifies particular insured properties 20 following a specified number of months of coverage so that an underwriting inspection report 55 may be ordered. The apparatus 10 records the name of the inspector and stores the results of the inspection, including electronic images. The electronic images are graphic reports of the property 20, including exterior view, immediate surroundings, and interior if desired. The insurance carrier 14 uses this information to offer proposal to the purchaser of the property 20 for the permanent coverage when the construction project is complete. The apparatus 10 also records the results of this solicitation process.

In the illustrated embodiment, the data processing equipment of the apparatus 10 for administering the system consists of a central computer located at the insurance carrier 14 connected to a network of remote workstations such as standalone microprocessors at the retail lending institution. Operational communication is conducted through modem connection between the central computer and the workstations. The insurance carrier provides the base rates and rating factors used to compute the premiums to be charged for each new property insured, the upload report confirmations, the loss experience information and return premium information. Data is also uploaded from the retail lending level to the insurance company on each construction project insured. The central computer includes the Rate Calculator and the Database Program of construction loan information. The database is edited at the workstation level to add new loans or to document paid loans for the monthly upload to the insurance carrier's central computer. The database is updated by the download of the insurance company indicating payment confirmations, loss experience and return premiums on paid loans. The system also coordinates the Electronic Funds Transfer of premiums with each monthly report to the insurance carrier.

Figure 3:
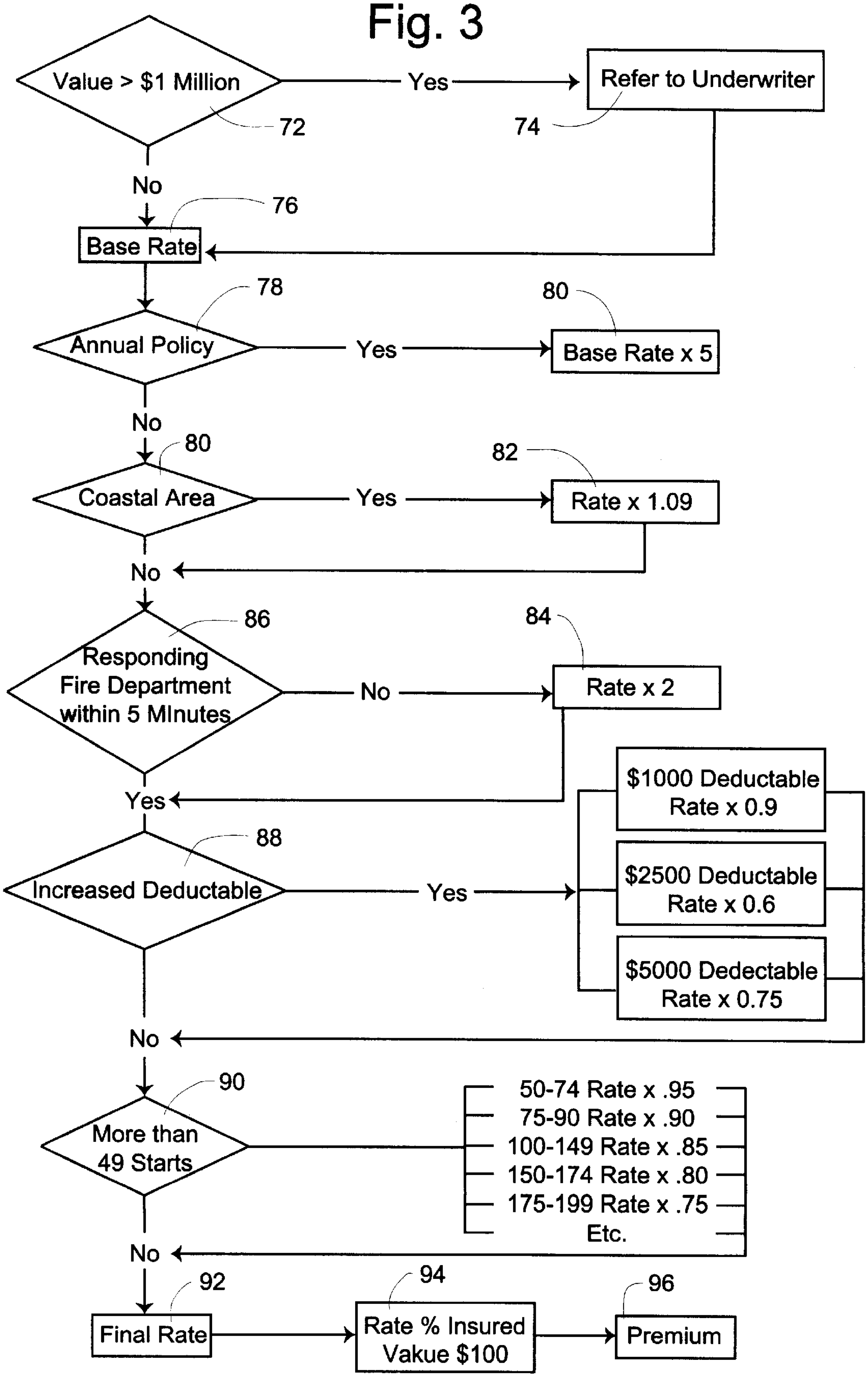
FIG. 3 is a schematic illustration of a rate calculator used by a lending institution in the construction loan collateral insurance apparatus illustrated in FIG. 1.

The insurance carrier determines a base rate for property insurance coverage based on the completed value of the building to be insured during construction. The base rate information, deductible limits, and other conventional rating factors and information are communicated to the workstations at the lending institution 16. The Rate Calculator implemented in the lending institution's workstation uses this base rate, options and other factors supplied by the insurance carrier to compute the final rate to be charged. FIG. 3 illustrates a schematic diagram for determining coverage rate 70 for construction of buildings in the State of Georgia, using rates, coverage options and related rating factors for that state. It is appreciated that rates, options and factors vary from state to state and from insurance carrier to insurance carrier; however, the logic and data flow for other states is readily adapted by one of ordinary skill in the art based on the teachings of the present invention.

The insurance carrier 14 provides collateral loan coverage up to a pre-determined amount 72 for any one loan under the single policy 15 having a predetermined maximum value for the aggregated construction loan portfolio of the lending institution 16. In the illustrated embodiment, the insurance carrier 14 provides a single builder's risk policy 15 under which the lending institution may add construction loans which are each up to one million dollars 72. The maximum amount of the aggregated loans in the portfolio subject to the single policy is agreed to by the insurance carrier 14 and the lending institution 16. If a greater amount of insurance coverage is required 72 for any one particular project 20 of a builder 18, the lending institution 16 contacts 74 the insurance underwriter to determine the appropriate premium charge. The Base Rate includes the charge for "Special Form Coverage", including theft of building materials, with a $500 deductible for projects located within 5 miles of a responding fire department. The coverage may be provided on either an annual or monthly basis 78. The annual rate 80 is 5 times the monthly rate.

Territorial underwriting criteria is included as a surcharge in the determination of rate, and these criteria vary from state to state. There is a surcharge 80 if the construction project is located within particular coastal counties in Georgia. The surcharge is 9% for properties in the coastal counties of Bryan, Camden, Chatham, Glynn, Liberty or McIntosh 82. Other territorial underwriting criteria is incorporated in the analysis depending on the requirements of the particular state in which the property is located. The base rate is doubled 84 for properties not located within 5 miles of a responding fire department 86. The base rate is discounted for increased deductibles 88. In the illustrated embodiment, the discount is 10% for a $1,000 deductible, 20% for a $2,500 deductible and 25% for a $5,000 deductible. A credit factor is applied 90 to the base rate for builders/borrowers with multiple construction loans. Multiple loans are determined by a common identifier, such as the Federal Tax Identification Number of the builder/borrower 18 on the loan application and origination documents. The Final Rate 92 is multiplied 94 by the completed appraised value of the structure under construction divided by 100 to determine the premium 96 for the particular property 20 to be insured for the builder 18.

In the illustrated embodiment, the rate analysis is carried out by at the workstation at the lending institution. It is to be appreciated that such analysis may also be accomplished by the central processor to which the rate and insured information is communicated. It is within the scope of the present invention that the workstation of the lending institution 16 will query the central computer at the insurance carrier 14 for updates of the rates, coverage options and rating factors. In an alternate embodiment, the insurance carrier 14 communicates the rate and factor changes to the remote workstations as changes occur.

The invention will operate independently or, as an option, will interface with the lending institution's current automation system to provide "single entry" automation. The retail lending institution will enter their normal loan information such as branch code, loan originator/officer name, loan number, the loan origination date, borrower name, address, phone number and federal tax ID number, the physical address of the property, the amount of the loan, the appraised value of the completed project and the escrow account number that contains the construction loan proceeds on their automation system. This data and information is provided 44 from the loan origination documentation. The apparatus 10 thereafter requires information as to whether the building project 20 is within a particular distance a responding fire department, the desired deductible amount and the premium mode (either monthly or annual).

The data records for each insured property 20 in the database will have an historical activity log that can be viewed to document activity for that particular insured location. Once the loan is made, the lending institution initiates the coverage by recording the loan origination date. The apparatus 10 initiates a transfer of funds 46 for the modal premium from the construction escrow account to the lending institution's premium trust account. The time and amount of the premium payment is reflected on that insured property's historical activity log.

Periodically, and preferably once each month, the apparatus scans 51 the database 12 for new loans, active loans, and paid loans. With reference to FIGS. 1 and 2, the apparatus 10 generates period analysis and reports generally 52. Preferably, this analysis and reporting is accomplished automatically on a monthly basis. The periodic analysis of the database provides three functions: identify new construction loans 20 added 54 to the policy 15 during the reporting period; reporting 56 on active construction loans 20 subject to the single policy 15 during the reporting period; and reporting 58 on construction loans closed during the reporting period.

The new construction loan analysis 54 identifies construction loans 20 added to the database 12 since the previous monthly report to the insurance carrier 14. The apparatus 10 tracks the date and time that database was searched for the current monthly reports, compares the date and time of the prior month's search, and identifies new loans for properties 20 with origination dates between the two scan dates. For identified new loans 20, a record is made of the initial report to the insurance carrier on that property's activity history log. As appropriate depending on the premium payment selected 46, the apparatus initiates another premium payment from the escrowed construction funds to the lending institution's premium trust account. This transfer of funds for the premium payment is recorded on the property's activity history log.

The second monthly search identifies the active construction loan accounts 56. The apparatus 10 identifies those properties 20 with origination dates prior to the current reporting period and without a "paid in full" date. The monthly cycle of query, report, and premium payment will continue on these active construction loans until the project 20 is completed and the construction loan is paid off or up to the maximum extent of coverage agreed to by the insurance carrier. Generally, insurance carriers provide coverage for any property 20 for up to a predetermined period, generally twelve months, due to the increased risk of a vacant property beyond that period of time. The apparatus 10 in the illustrated embodiment identifies aged property and reports to the lending institution any property which is insured for ten or more months. After the predetermined period of coverage, the insurance ceases and other coverage would required. The Aged Property Coverage Report alerts both the lending institution 16 and the insurance carrier 14 of those properties 20 that may have to be separately insured as vacant dwellings if such are completed and remain unsold. The property's activity history log reflects the expiration date of the coverage under the blanket policy 15. It is noted that in some circumstances, the lending institution 16 has a "forced placement" contract with an insurance carrier. The apparatus 10 accordingly permits manual entries to be made in the property's history log to record the "forced placed" or vacant dwelling coverage. It is important to note that for auditing purposes, the activity history log entries made by the apparatus 10 may not be edited or deleted and remain a part of the permanent record of that insured property.

During the third monthly database search, the apparatus 10 identifies those property locations 20 where the loan paid 58 data field has been completed since the last monthly report to the insurance carrier. The apparatus 10 compute 33 the earned premium prorated to the date the loan was paid and initiates a transfer 64 of the return premium from the lending institution's premium trust account if the location was reported on a monthly basis. It is noted that conventionally for an insured property 20 that is reported monthly, the initial premium payment made at the time the loan origination date was entered is held in the lending institution's premium trust account for the duration of the loan. The other monthly premium payments were made each month that the insured location was reported as an active construction loan. The final monthly prorated premium is paid from that initial premium payment, because there would be no escrowed construction funds to pay the premium once the construction loan is paid in full. The premium on an annual policy is transferred to the insurance carrier 14 with the initial report of the insured property location. The prorated return of the unearned premium is initiated 54 when the paid date for that location is reported to the insurance carrier 14. The return of unearned premiums on annual policies is downloaded 64 from the insurance carrier to the lending institution each month with a report.

In the illustrated embodiment, the results of the searches and reports 54, 56, and are compiled into a report that is preferably encrypted and electronically sent 53 to the insurance carrier 14. This Covered Location Report will includes the lending institution code, branch code (if appropriate), loan number, loan origination date (effective date of coverage), borrower name, address, phone number and federal tax ID number, physical property address, appraised value, coverage amount and deductible, mode premium, coverage dates and the date the loan was paid off (the cancellation date of coverage). The total premium for all reported locations is also transferred, preferably electronically, 62 to the insurance carrier from the lending institution's premium trust account. The insurance carrier 14 receives the Covered Locations Report and the premium payment. The apparatus 10 reconciles and verifies the information 32. The apparatus 10 then downloads a confirmation of premium received 34 to the lending institution 16. The apparatus 10 makes an entry on the historical activity log of each active loan that verifies the receipt of the premium for that location. The Coverage Confirmation Certificate is provided 36 to each Builder/Borrower 18 on all the new loans reported.

The insurance carrier 14 provide Loss Experience information 38 on each insured property 20 that suffers an insured loss. This loss experience information is communicated to the lending institution's workstation database. This information is used by the lending institution to generate loss experience reports 60 for tracking the performance and risks of the particular builders 18.

Insured Portfolio Management Reports may be generated by the lending institution 16 during the month. These reports may be customized from the portfolio level, to lending institution branch office level, to loan originator/officer level, to individual, insured location level. The Upload Info Report 54 includes the date and time of all monthly uploads reported to the insurance carrier 14, together with the branch code originating the loan, the loan number, the insured builder/borrower's name, address and tax ID number, the covered location address, the coverage amount and deductible, the mode premium, the loan origination date and the loan paid date. The paid premiums, earned premiums and coverage amounts are totaled at the bottom of the report.

The Active Loan Report 56 includes the originating branch code, the loan number, insured builder/borrower's name, insured property address, coverage and deductible amounts, loan origination date and coverage paid to, date for all current insured locations. The premiums and coverage totals appear at the bottom of the report.

The Paid Loan Report 58 includes information only on those locations where the construction loan has been paid in full and the coverage has been cancelled. This report will include the originating branch code, the loan number, the insured builder/borrower's name and address, the insured property address, coverage and deductible amounts, the loan origination and paid dates (the effective and expiration dates of the property coverage) and the amount of unearned premium returned prorated to the date the loan was paid. The return premium is totaled at the bottom of the report. This report also identifies any locations that were paid on an annual basis where the return premium has been calculated, but the transfer of the premium has not yet been made by the insurance carrier 14.

The Loss Experience Report 60 may be generated selectively for the entire insured portfolio, for a lending institution branch, for a particular loan originator/officer within a branch, or for an insured builder/borrower (based on the federal tax identification number) or for an individual insured property 20. The report displays the lending institution's blanket policy number 15, the lending institution's branch code, the loan number, the insured builder/borrower, the covered location address, the coverage and deductible amount, the loan originator/officer, the loan origination date and the premiums paid prorated to the date the report is generated showing earned and unearned premiums and the dates and amounts of any losses incurred by insured location. The earned premiums and incurred losses are totaled at the bottom. The loss amount is divided by the premium amount to determine the loss ratio.

Figure 4:
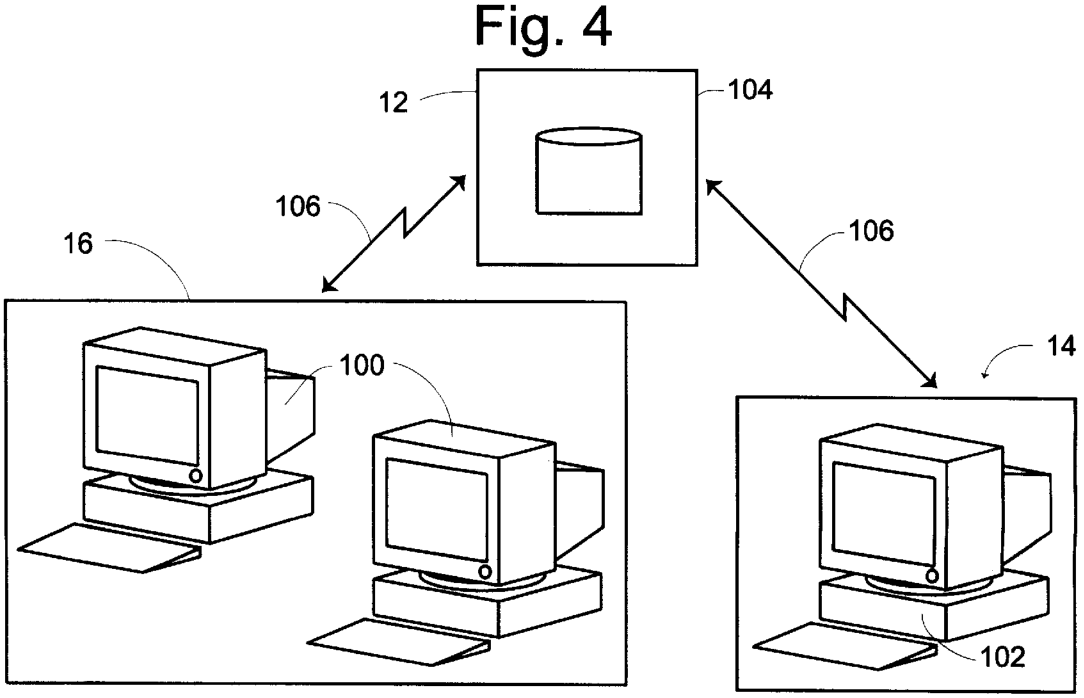
FIG. 4 is a schematic illustration of a computing network for the construction loan collateral insurance apparatus illustrated in FIG. 1.

With reference to FIG. 4, it is to be appreciated that the present invention has been described with an embodiment having a central database 12 accessed by remote workstations 100 at lending institutions 16 for providing loan information for computing insurance rate computations with insurance information from a workstation 102 at the insurance carrier 14. Lending officers at the branches of the lending institution 16 provide the particular information about the property 20 and the builder 18 to the central computer complex 104 which operates the database 12 where the rate computations are made. This is accomplished by transfer of the data and information from a template screens on the workstations 100 and 102. Such template screens prompt and verify data entry prior to transfer by modem or other connection mechanism 106 such as by an interactive global network for electronic mail. The database 12 is preferably maintained by an entity accustomed to the appropriate and necessary security for financial databases and access and use of such by remote users.

Figure 5:
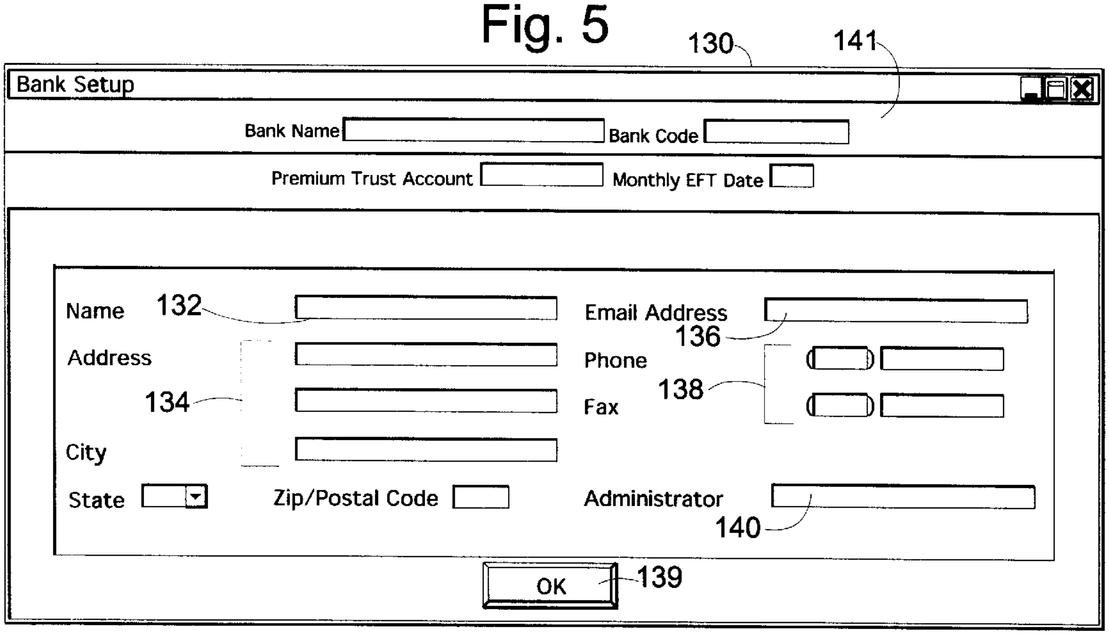

FIGS. 5–12 are screen displays for the construction loan collateral insurance apparatus according to the present invention. FIG. 5 illustrates a bank setup screen 130 in which the lending institution 16 provides its name 132, address 134, electronic mail address 136, and phone numbers 138, together with the name 140 of the administrator of the apparatus 10. A control button 139 accepts the information. A header 141 displays bank and loan information. This bank setup screen 130 is used when the apparatus 10 is first installed at a lending institution 16, and to modify bank-level information.

Figure 6:
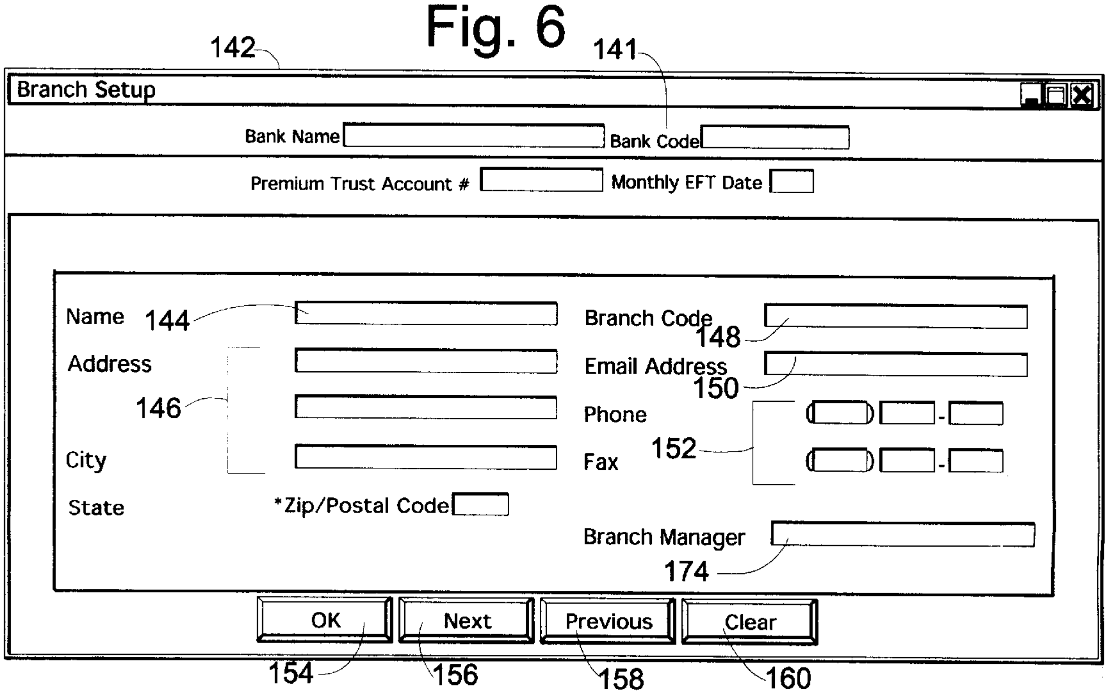

FIG. 6 illustrates a setup screen 142 for each branch of the lending institution 16 provided with a work station 100 for operating the apparatus 10. The branch setup screen 142 includes the name of the branch 144, its address 146, and manager name 174, together with a branch code 148, electronic mail address 150, and telephone numbers 152. Control buttons 154 accepts the entered information on the screen, transfers control to the next screen 156, returns to a previous screen 158, or clears 160 the particular screen.

FIG. 7 illustrates a loan officer setup screen for entry of information about each loan officer authorized to use the apparatus 10. The apparatus 10 receives the name 164, address 166, and an identification code 168 for the particular loan officer, as well as electronic mail address 170, and telephone information 172. Control buttons generally 176 on the screen 162 accept the keyed information, transfer control to a subsequent or a previous screen, and clear the entries from the screen for entering new information. Once the bank, branch, and loan officers are established, loans can be entered into the apparatus 10.

FIG. 8 illustrates the screen 178 for initiating collateral insurance coverage for a loan. The screen 178 receives the trust account number 180 for the loan in question together with the electronic funds transfer date 182. Control buttons generally 184 direct to the bank the setup screen 130 illustrated in FIG. 5, the branch setup screen 142 illustrated in FIG. 6, and the loan officer setup screen 162 illustrated in FIG. 7. The screen 178 includes the control buttons 176 discussed above.

Upon entry of the account number 180, the lending officer accesses a screen 186 illustrated in FIG. 9. Borrower information including name 190 and address 192 together with phone information 194 is entered. If there is co-borrower 196, the co-borrower button 198 presents a screen similar to the borrower information portion of the screen 186 for entering the co-borrower information. The construction site location is also identified with the street lot and subdivision name 200 with the county 202, city 204, and postal zip code 206. The site is identified as being within city limits 208 or not, and its location within a predetermined distance of the fire department 210. Flood coverage requirement is indicated 212. Identification as a model home is handled by the toggle "yes/no" switch 213. Control buttons generally 214 direct the loan officer to the next screen, clear the information, close the loan, or exit. In a header 216, information about the particular loan is displayed. The header 216 includes tabs 217 to transfer to the various screens as indicated by the name in the tab. The buttons 208, 210, 212, and 213 are pull-down menus providing several predetermined responses relevant to the particular button. The arrow indicates a pull-down menu in this and other screens discussed below.

FIG. 10 illustrates a screen 218 for completing the construction site information. The construction loan information from the screen 186 is carried over for reference purposes. The screen 218 includes particular location information about the building under construction including the square footage 220 and the number of stories 222. The appraised value less the value of the land for the completed building 224 is entered together with the type of construction 226, a coverage amount 228, and a deductible 230. The monthly premium 232 and pro rata first months premium 234 are displayed after being computed upon submission of the construction loan information to the central computer 28. The header 216 displays relevant information about a loan, when the screen is used to update the loan account.

FIG. 11 illustrates a screen 236 in which remarks can be entered to the database 12 about the particular loan. The remarks section 238 includes the auditor's trail of transactions affecting the construction loan and its collateral coverage, as discussed above. Particularly, the remarks show changes made as the construction progresses to closing the loan. The control buttons 239 include a submit button to submit the loan and collateral information to the central computer 28.

A report screen 240 is illustrated in FIG. 12. The screen assists developing management reports of information in the database 12 using various sorting and filtering features. The buttons are preferably pull-down to provide several relevant options for each category. A report-type field 242 allows selecting the report, including the upload information report 54, the active loan report 56, the paid loan report 58, and the loss experience report 60. A criteria field 244 provides selection criteria for the particular report. This selection criteria includes the state 246, the particular lending institution 248, the branch 250, or the loan officer 252. Particular loan numbers can be selected 254, or loan dates 256, or loan amounts 258. Other criteria includes the pay-out date 260 and location codes 262. Reports can be selected by tax identification number 266, so all properties associated with a particular builder can be examined. Particular escrow accounts 266 can be examined. The loan status field 268 allows reports based on active, closed, or arrears loans. Sort capability 270 is provided.

It is to be appreciated that with the screens shown in FIGS. 5–12, appropriate validation tests may be used, including validation and verification of date information, numeric fields verified for numbers, and the like. Upon completing the screens for entering the loan information, the loan officer submits the information to the central computer for processing as set forth above. Accordingly, the present invention provides a readily usable interface for submitting construction loan information to the database for construction loan collateral insurance coverage according to the present invention.

While this invention has been described in detail with particular reference to the preferred embodiments thereof, the principles and modes of operation of the present invention have been described in the foregoing specification. The invention is not to be construed as limited to the particular forms disclosed because these are regarded as illustrative rather than restrictive. Moreover, modifications, variations and changes may be made by those skilled in the art without departure from the spirit and scope of the invention as described by the following claims.

What is claimed is:

1. An apparatus for initiating, maintaining, and reporting collateral loan insurance for construction loans made by a lending institution to at least one construction contractor, comprising:

a central electronic complex maintaining a database of collateral insurance provided by an insurance carrier under a single builder's risk policy for a plurality of construction loans originated by a lending institution for projects constructed by one or more builder;

insurance carrier communication means for accessing the electronic complex to provide insurance rate information and to obtain reports about collateral insurance for the construction loans;

lending institution communication means for accessing the electronic complex to initiate, maintain, and report on collateral insurance for construction loans provided by the lending institution to the builders under the single builder's risk policy; and reporting means for reporting to the insurance carrier and to the lending institution information about the collateral insurance.

2. An apparatus for initiating, maintaining, and reporting collateral loan insurance for construction loans made by a lending institution to at least one construction contractor, comprising:

a central electronic complex maintaining a database of collateral insurance provided by an insurance carrier under a single policy for a plurality of construction loans originated by a lending institution for projects constructed by at least one builder;

a microprocessor-based work station provided to the insurance carrier for accessing the electronic complex;

means for the insurance carrier to provide insurance rate information to the electronic database and to obtain reports therefrom about collateral insurance coverage for the construction loans;

means for the lending institution to initiate and maintain collateral insurance for construction loans provided by the lending institution to the builders; and reporting means for reporting to the insurance carrier and to the lending institution information about the collateral loan coverage provided under the single policy.

3. A method of centralized initiation with a computer system, maintenance, and reporting of collateral insurance for construction loan portfolio held by a lending institution, comprising the steps of:

(a) calculating an insurance rate for a construction loan provided by a lending institution to a builder using rate information provided by a insurance carrier;

(b) initiating insurance coverage under a single builder's risk policy provided by the insurance carrier to the lending institution by adding to a central coverage database identifying indicia related to the construction loan and builder;

(c) providing premium payments for the insurance coverage from the lending institution to the insurance carrier on behalf of the builder holding the construction loan with the lending institution;

(d) confirming insurance coverage by the insurance carrier to the lending institution for the construction loan to the builder under the single policy provided by the insurance carrier to the lending institution.

4. The method as recited in claim 3, further comprising the steps of:

providing to the database loss information by the insurance carrier relating to claims made by the builder against the insurance coverage; and generating loss reports for evaluation of insurance coverage.

5. The method as recited in claim 3, further comprising the step of reconciling funds transfer from the lending institution to the insurance carrier with existing loans subject to collateral insurance policy.

6. The method as recited in claim 3, further comprising the steps of:

updating the database with paid loan information; and computing premium return for paid loans.

7. The method as recited in claim 6, further comprising the step of transferring premium return for paid loans from the insurance carrier to the lending institution.

8. The method as recited in claim 7, further comprising the step of reconciling by the lending institution the premium return paid by the insurance carrier with paid loans.

9. The method as recited in claim 3, further comprising the step of generating a management report of loans added to the single policy by the lending institution during a selected period.

10. The method as recited in claim 3, further comprising the step of generating a management report of loans for which collateral insurance coverage is provided to builders under added the single policy by the lending institution during a selected period.

11. The method as recited in claim 3, further comprising the step of removing closed loans from the active loans subject to collateral coverage by the single policy.

12. The method as recited in claim 11, further comprising the step of generating a management report of loans closed by the builder during a selected period, whereby premium repayments from the insurance carrier are reconcilable by the lending institution with the closed loans.

13. A data processing system for lending institutions to initiate, report, and confirm insurance coverage for buildings used as collateral for construction loans, comprising:

means for maintaining a portfolio of building projects which are collateral for loans by a lending institution to finance the construction thereof, which buildings are subject to insurance coverage to reduce the risk to the lending institution against loss thereof, said insurance coverage provided by an insurance carrier to the lending institution as a single policy with the lending institution;

means for determining insurance premiums for the building projects included within the portfolio;

means for transferring funds by the lending institution for the insurance premium for each building project in the portfolio from a construction loan account associated with each building to a trust account for the insurance carrier;

means for transferring periodically the accumulated funds for insurance premiums from the trust account to the insurance carrier; and means for reporting the status of projects and insurance coverage therefore.

* * * * *